United States Patent

Petersen et al.

(10) Patent No.: US 7,784,568 B2
(45) Date of Patent: Aug. 31, 2010

(54) METHOD AND APPARATUS FOR CONTROLLING TRACKED VEHICLES

(75) Inventors: John Petersen, Providence, UT (US); Eric Poulson, Paradise, UT (US)

(73) Assignee: Freeport-McMoRan Copper & Gold Inc., Phoenix, AZ (US)

( * ) Notice: Subject to any disclaimer, the term of this patent is extended or adjusted under 35 U.S.C. 154(b) by 162 days.

(21) Appl. No.: 12/233,284

(22) Filed: Sep. 18, 2008

(65) Prior Publication Data

US 2010/0065345 A1    Mar. 18, 2010

(51) Int. Cl.
   *B62D 11/00* (2006.01)
(52) U.S. Cl. .......................... 180/6.7; 701/83
(58) Field of Classification Search ............... 180/6.7, 180/9, 9.1, 9.21; 701/82, 83, 70, 72, 78
   See application file for complete search history.

(56) References Cited

U.S. PATENT DOCUMENTS

| | | | |
|---|---|---|---|
| 3,964,562 A * | 6/1976 | Kawamura et al. ........... 180/6.7 |
| 4,037,677 A * | 7/1977 | Koch .......................... 180/6.7 |
| 4,143,415 A | 3/1979 | Klingbeil | |
| 4,168,757 A | 9/1979 | Mather et al. | |
| 4,479,563 A * | 10/1984 | Horsch ....................... 180/6.7 |
| 4,488,242 A | 12/1984 | Tabata et al. | |
| 4,515,221 A | 5/1985 | van der Lely | |
| 4,645,022 A * | 2/1987 | Bergquist ................... 180/6.7 |
| 4,702,358 A * | 10/1987 | Mueller et al. ............ 192/13 R |
| 4,705,449 A | 11/1987 | Christianson et al. | |
| 4,713,594 A | 12/1987 | Bose et al. | |
| 5,056,072 A | 10/1991 | Wachi | |
| 5,201,378 A | 4/1993 | Bamford | |
| 5,325,933 A * | 7/1994 | Matsushita .................. 180/6.7 |
| 5,618,087 A | 4/1997 | You | |
| 5,847,527 A | 12/1998 | Iwashiro | |
| 6,041,870 A | 3/2000 | Zimmerman et al. | |
| 6,141,613 A * | 10/2000 | Fan ............................. 701/50 |
| 6,351,664 B1 | 2/2002 | Brodnick | |
| 6,718,244 B2 | 4/2004 | Lin et al. | |
| 6,752,250 B2 | 6/2004 | Tanner | |
| 6,766,236 B1 | 7/2004 | Lamela et al. | |
| 6,781,355 B2 | 8/2004 | Gauthier et al. | |
| RE38,632 E * | 10/2004 | Schmidt et al. .............. 701/41 |
| 6,842,351 B2 | 1/2005 | Gauthier et al. | |
| 6,923,298 B2 | 8/2005 | Tanner | |
| 6,942,047 B2 | 9/2005 | Woytassek | |
| 7,213,690 B2 | 5/2007 | Tanner | |
| 7,264,068 B2 | 9/2007 | Priepke | |
| 7,690,734 B2 * | 4/2010 | Oehme ....................... 303/9.61 |

OTHER PUBLICATIONS

Golconda, Suresh, Master's Thesis entitled, "Steering Control for a Skid-Steered Autonomous Ground Vehicle at Varying Speed," University of Louisiana at Lafayette, Feb. 23, 2005, 58 pages.

* cited by examiner

*Primary Examiner*—Tony H. Winner
(74) *Attorney, Agent, or Firm*—Fennemore Craig, P.C.

(57) ABSTRACT

Apparatus for controlling a track on a tracked vehicle may comprise a drive system, a clutch, a brake, and a track control system to operate the clutch and the brake. A control signal generator operatively associated with the track control system produces control signals that vary at a first rate to cause the track control system to transition the clutch from an engaged state to a disengaged state and produces control signals that vary at a second rate to cause the track control system to transition the brake from an initial application state to a full application state, the second rate being less than the first rate.

26 Claims, 4 Drawing Sheets

METHOD AND APPARATUS FOR CONTROLLING TRACKED VEHICLES

TECHNICAL FIELD

This invention relates to vehicle control systems in general and more specifically to methods and apparatus for operating and steering tracked vehicles.

BACKGROUND

Tracked vehicles commonly involve the use of two or more endless belts or tracks that are supported by corresponding bogie assemblies. A plurality of road wheels mounted to the bogie assemblies roll along the tracks and support the vehicle, while a drive wheel or sprocket provides the driving force for the track, thereby causing the vehicle to move. The tracks provide a much larger surface area than is generally the case with a wheeled vehicle and thereby exert a much lower force per unit area on the ground being traversed compared to a conventional wheeled vehicle of the same weight. Accordingly, tracked vehicles are well-suited for use on soft and uneven ground, such as mud, ice, and snow. They are also ideal for use on large, heavy vehicles, again for primarily the same reason of lower force per unit area on the material being traversed.

A tracked vehicle is directed or steered by varying the speed of the tracks on opposite sides of the vehicle. However, the mechanisms for varying the track speeds often act abruptly, e.g., by suddenly applying braking forces or driving forces to the tracks. The sudden application to the tracks of the braking and driving forces increases the stresses imposed on various driveline components (e.g., clutches and transmissions) as well as on the track links themselves.

SUMMARY OF THE INVENTION

One embodiment of a method for controlling a track on a tracked vehicle may comprise: Receiving a vehicle control command from a vehicle control system; processing the vehicle control command in accordance with a control schedule to produce control signals; and applying the control signals to a track control system. The control signals cause the track control system to at least: operate the track in a driven state; transition the track from the driven state to an initial brake application state at a first rate; and transition the track from the initial brake application state to a full brake application state at a second rate, the second rate being less than the first rate.

Another method for controlling a track on a tracked vehicle may comprise: Receiving a vehicle control command from a vehicle control system; processing the vehicle control command in accordance with a control schedule to produce control signals; applying to a track control system a first control signal that varies at a first rate to cause the track control system to transition the track from a driven state to an initial brake application state; and applying to the track control system a second control signal that varies at a second rate to cause the track control system to transition the track from the initial brake application state to a full brake application state, the second rate of said second control signal being less than the first rate of the first control signal.

Apparatus for controlling a track on a tracked vehicle may comprise a drive system, a clutch, a brake, and a track control system to operate the clutch and the brake. A control signal generator operatively associated with the track control system produces control signals that vary at a first rate to cause the track control system to transition the clutch from an engaged state to a disengaged state and produces control signals that vary at a second rate to cause the track control system to transition the brake from an initial application state to a full application state, the second rate being less than the first rate.

BRIEF DESCRIPTION OF THE DRAWINGS

Illustrative and presently preferred exemplary embodiments of the invention are shown in the drawings in which.

DETAILED DESCRIPTION

Figure 1:
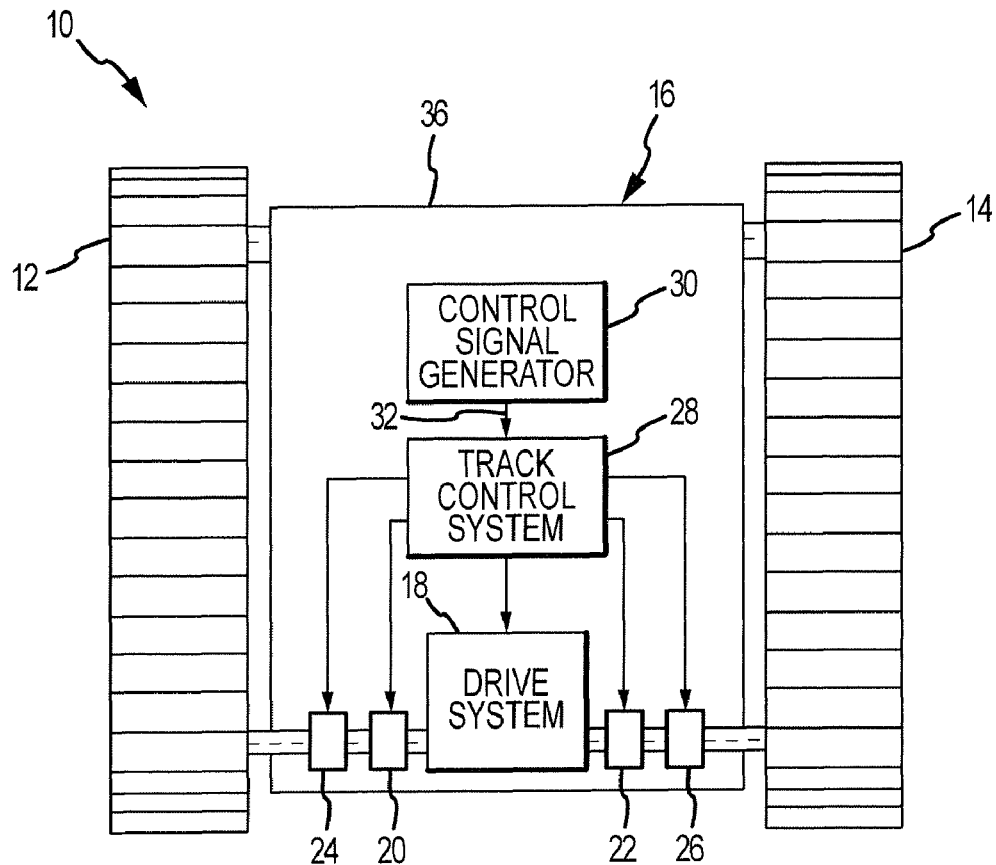
FIG. 1 is a schematic representation of a tracked vehicle having two opposed sets of tracks.

One embodiment of apparatus 10 for controlling one or more tracks 12, 14 on a tracked vehicle 16 is illustrated in FIG. 1 and may comprise a drive system 18 that is operatively connected to the tracks 12, 14 via respective clutch systems 20, 22, and brake systems 24, 26. A track control system 28 operatively connected to the clutch systems 20, 22 and brake systems 24, 26 can independently control the operation of the clutches 20, 22 and brakes 24 and 26. Track control system 28 may also be operatively connected to the drive system 18. When the clutches 20, 22 are engaged (i.e., either separately or together), they connect the respective tracks 12, 14 to the drive system 18. Tracks 12, 14 are disconnected from the drive system 18 when the clutches 20, 22 are disengaged. Brakes 24, 26 may be operated (again, separately or together) to apply braking forces to the tracks 12, 14. Brakes 24, 26 are generally operated when the clutches 20, 22 are disengaged, although this need not be the case. Apparatus 10 may also comprise a control signal generator 30 that generates control signals 32 that are used by track control system 28 to operate the clutches 20, 22 and brakes 24, 26 in order to control the tracks 12, 14 of tracked vehicle 16.

The signals 32 produced by the control signal generator 30 may be varied or altered in a way that is recognizable to the track control system 28 so that track control system 28 can operate the clutch and brake systems 20, 22 and 24, 26, and/or drive system 18 to achieve a desired operational state of the tracks 12, 14. That is, the control signals 32 cause the track control system 28 to operate the tracks 12, 14 to cause the tracked vehicle to move in the forward or reverse directions and to turn left and right. By way of example, in the embodiments shown and described herein, the control signals 32 may be modulated (i.e., varied) between a 0% modulation level or state and 100% modulation level or state, although other methodologies are possible. The degree of modulation is recognized (e.g., decoded) by the track control system 28 which then operates the clutch and brake systems 20, 22 and 24, 26 in accordance with the degree of modulation of control signals 32.

Figure 2:
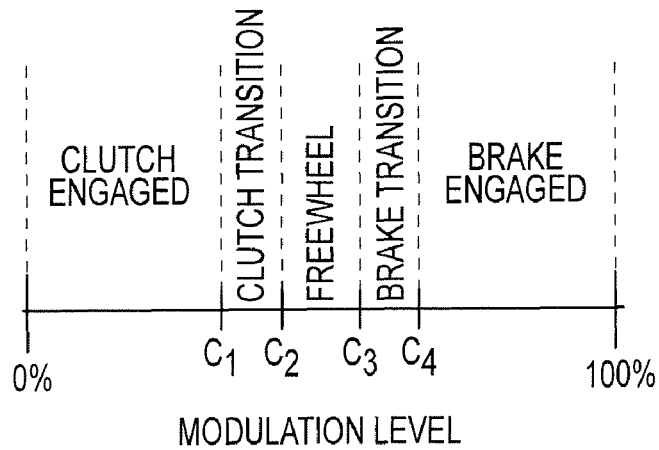
FIG. 2 is a schematic representation correlating the response of the clutch and brake systems to various modulation levels of control signals.

For example, and with reference primarily to FIG. 2, when the modulation level of control signals 32 is between 0% and a level $C_1$, the track control system 28 operates the clutch 20 so that it is in the fully engaged state. The track control system 28 also operates the brake system 24 so that it is in the fully released position or state. Thus, when the modulation level of the control signals 32 is between 0% and level $C_1$, the track 12 will be fully connected to the drive system 18 via engaged clutch 20 and the brake 24 will offer no resistance (or substantially no resistance) to the movement of track 12.

When the modulation level of control signals 32 is between $C_1$ and $C_2$, the track control system 28 operates the clutch 20 to move it from the fully engaged state to the fully disengaged state while maintaining the brake 24 in the off or released position. That is, when the degree of modulation of the control signals 32 is between $C_1$ and $C_2$, the clutch 20 is in transition, either moving from the engaged state to the disengaged state or vice-versa, depending on whether the degree of modulation is moving from $C_1$ to $C_2$ or from $C_2$ to $C_1$.

In the exemplary embodiment depicted in FIG. 2, the track 12 will be in a freewheel state when the control signals 32 have a modulation between levels $C_2$ and $C_3$. That is, the clutch 20 will be fully disengaged, thereby fully disconnecting the track 12 from the drive system 18. Brake 24 will not yet be applied. The track 12 will remain in the freewheel state until the modulation level of the control signals 32 reaches $C_3$, at which point the track control system 28 will begin to activate the brake 24, i.e., by placing brake 24 in an initial application state. The track control system 28 will continue to operate the brake 24 to gradually increase braking effort with increasing modulation, reaching a full brake application state when the degree of modulation of control signals 32 reaches level $C_4$. Thereafter, the brake 24 will remain in the full application state (i.e., be fully applied) when the modulation is between level $C_4$ and 100%. Stated another way, maximum braking effort is applied by the brake system 24 when the modulation level of control signals 32 is between level $C_4$ and 100%.

To summarize then, in the embodiment shown and described herein, the control signals 32 cause the track control system 28 to operate the clutch system 20 so that it is in the fully engaged state when the modulation level of the control signals 32 is between 0% and $C_1$. The track control system 28 will transition the clutch 20 to the disengaged state when the modulation level of the control signals 32 is between $C_1$ and $C_2$, ultimately reaching the fully disengaged state when the modulation level reaches $C_2$. The track 12 will be in the freewheel state when the modulation level is between $C_2$ and $C_3$. That is, neither driving forces nor braking forces are applied to the track during the freewheel state. The brake transition region exists when the modulation of the control signals 32 is between $C_3$ and $C_4$, with the brake 24 entering the initial application state at modulation level $C_3$, and reaching the full application state at modulation level $C_4$.

Consequently, the tracked vehicle 16 may be made to move in any feasible direction by causing the control signal generator 30 to provide the appropriately modulated control signals 32 to the track control system 28. For example, the tracked vehicle 16 may be caused to move in the forward direction by generating control signals 32 that cause both clutches 20, 22 to be fully engaged. Likewise, the tracked vehicle 16 may be stopped by disengaging the clutches 20, 22 and by applying the brakes 24, 26. The tracked vehicle 16 may be turned by stopping (i.e., braking) one track (e.g., track 12), while driving the other track (e.g., track 14).

The present invention involves operating the control signal generator 30 to produce the control signals 32 in accordance with certain control profiles or schedules to cause the track control system 28 to operate the clutch and brake systems in a manner that will maximize vehicle control and responsiveness while also minimizing the stress that will be placed on the tracks and vehicle drive system components, including the clutch and brake systems.

Figure 4:
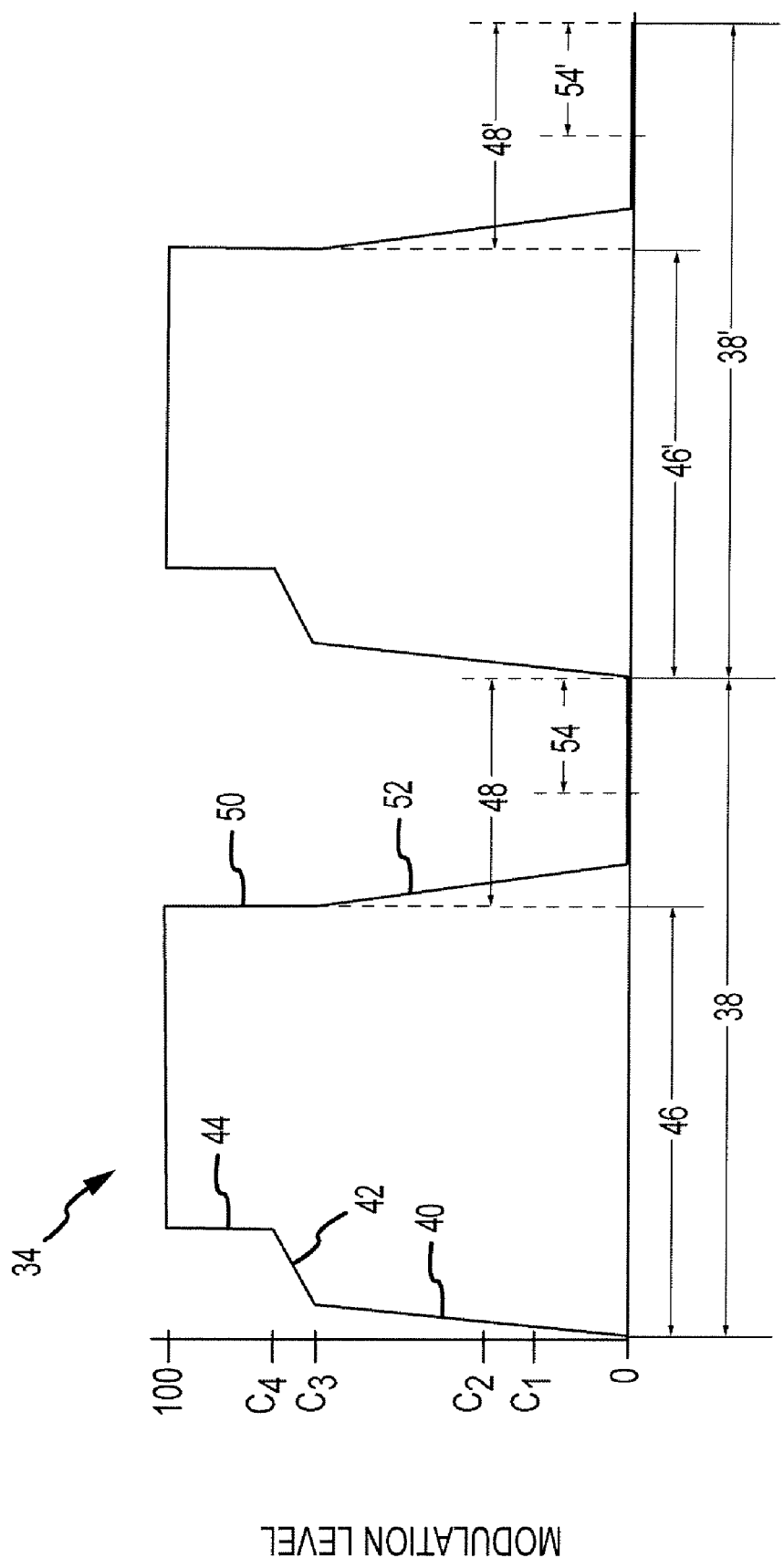
FIG. 4 is a graphical representation of a first embodiment of a clutch/brake time cycle control schedule.

Referring now to FIG. 4, one embodiment of a control schedule 34 causes the control signal generator 30 to vary the modulation level of the control signals 32 at various rates depending on the particular action that is to be performed. For example, if it is desired to transition one of the tracks (e.g., track 12) from the driven state to the fully braked state, the control signal generator 30 varies the modulation level of the control signals 32 at a first rate 40 between 0% modulation and the modulation level $C_3$, i.e., when it is desired to disengage the clutch 20, until the point where the brake 24 is applied. Then, for brake application, i.e., between the initial brake application state and the full brake application state, the control signal generator 30 changes or varies the modulation level of the control signals 32 at a different, but lower, rate 42 from level $C_3$ to level $C_4$.

Changing or varying the modulation levels of the control signals 32 at two different rates causes the track control system 28 to transition the track 12 from the driven state to the initial brake application state at the first rate 40. The track control system 28 will then transition the track 12 from the initial brake application state to the full brake application state at the second rate 42, the second rate 42 being less than the first rate 40. As will be described in further detail below, the dual rate control schedule 34 may also be used to transition the track 12 from the fully braked state to the driven state, again at two different transition rates 50 and 52, as also illustrated in FIG. 4.

Significant advantages flow from the control schedule that results in the dual rate transition of the track between various states. For example, transitioning the clutch 20 from the engaged state to the disengaged state at a rapid rate (e.g., first rate 40) reduces stress and wear on the clutch 20. Still other advantages flow from the rapid transition of the track 12 through the freewheel state. For example, the rapid transition of the track 12 through the freewheel state minimizes uncommanded (e.g., undesired) vehicle response likely to result from the uncontrolled track movement during the freewheel state. Vehicle control and responsiveness is improved.

An example of an uncommanded and undesired vehicle response that can arise while one of the tracks is in the freewheel state is when the vehicle is ascending or descending an incline. If the vehicle is ascending an incline, the freewheeling track will slow and possibly reverse direction, which will result in a vehicle turn in the desired direction, but at a greater rate, and possibly to a greater degree, than was commanded. Conversely, if the vehicle is descending an incline, the freewheeling track may gain speed, which will slow the rate of turn in the desired direction. If the incline is steep, or if the freewheel period is too long, the freewheeling track may well result in a vehicle turn in the direction opposite from that commanded.

In contrast to the generally desired rapid transition of the track 12 through the clutch disengagement and freewheel states, the present invention provides additional advantages by slowing the rate at which the brake is applied. For example, the comparatively slow transition of the brake 24 from the initial application state to the full application state significantly reduces stress imposed on the tracks 12, 14, as well as on the brakes 24, 26. Consequently, the dual rate transition of the track between various drive states increases vehicle responsiveness (in that the clutch disengagement and freewheel states are transitioned rapidly), while minimizing stresses imposed by braking.

The dual rate transition of the present invention also provides considerable advantages in applications wherein it is desired to cycle the stopped track between the fully braked state and the driven state a number of times during a commanded turn. As mentioned, tracked vehicles are turned by slowing and stopping one track while continuing to move the other track. However, in many situations, it is not possible to maintain one track in the stopped position during the entire turn because of the tendency of the stopped track to dig-in and possibly become bogged down in the material being traversed. The likelihood that the stopped track will become bogged down can be considerably reduced by cycling the stopped track between the fully braked state and the driven state a number of times during the turn. While it is possible to transition the track between the driven state and the fully braked state at a high rate (i.e., in a short track cycle time) to reduce the likelihood of track dig-in, such short track cycle times impose considerable stresses on the braking system and tracks, often to the point where the frequency of track breakage becomes unacceptably high.

Increasing the track cycle time is no panacea, either. For example, while the track cycle time could be increased (i.e., to increase the time during which the track is transitioned between the driven state and the braked state) in order to reduce the stresses imposed by rapid braking, slowing the transition period by an amount sufficient to avoid excessive braking stresses would result in an unacceptably long track cycle time, thereby increasing the possibility of track dig-in. A long track cycle time also increases the likelihood that the vehicle will experience uncommanded movement (e.g., due to an excessively long period wherein the track is allowed to freewheel), thereby making the vehicle difficult to control and possibly resulting in excessive deviation from the desired vehicle course. In addition, and as mentioned above, a slow transition through the clutch disengagement state will typically result in excessive clutch wear.

Still yet another advantage of the present invention is that it is well-suited for use with remote or autonomous control systems that do not require a human operator to be present on the vehicle. For example, remote or autonomous control systems lack the presence of a human operator on the vehicle to sense and avoid improper or sub-optimal control movements, particularly the abrupt application of braking forces. Advantageously, the present invention eliminates the problems associated with the abrupt application of braking forces without sacrificing vehicle control and responsiveness, which are important factors in the remote or autonomous operation of such vehicles.

Having briefly described the vehicle control system of the present invention, as well as some of its more significant features and advantages, various exemplary embodiments and variations of the methods and apparatus of the present invention will now be described in detail. However, before proceeding with the description it should be noted that while the methods and apparatus are shown and described herein as they could be utilized in a particular type of tracked vehicle having a particular type of vehicle control system and vehicle dynamics (i.e., response characteristics), persons having ordinary skill in the art, after having become familiar with the teachings provided herein, will be able to readily adapt the methods and apparatus of the present invention for use with other types of vehicles having other types of control systems and response characteristics. Consequently, the present invention should not be regarded as limited to use with the particular vehicles and in the particular environments shown and described herein.

Referring back now primarily to FIG. 1, one embodiment of apparatus 10 for controlling one or more tracks 12, 14 on a tracked vehicle 16 is shown and described herein as it may be utilized on a tracked bulldozer available from the Caterpillar Corporation of Peoria, Ill. as model no. D-10. Accordingly, the particular mechanical systems and vehicle dynamics shown and described herein are those associated with this particular type of tracked vehicle. However, persons having ordinary skill in the art would be able to apply the methods and apparatus of the present invention to other types of tracked vehicles after becoming familiar with the teachings provided herein. Consequently, the particular invention should not be regarded as limited to application on the particular type of tracked vehicle shown and described herein.

Continuing now with the description, the tracked vehicle 16 shown and described herein comprises two tracks 12, 14 that are mounted on opposite sides of a vehicle body or chassis 36. Track 12 is connected to a drive system 18 via a clutch system 20 and a brake system 24, whereas track 14 is connected to drive system 18 via clutch system 22 and brake system 26. See FIG. 1. A track control system 28 is operatively connected to the two clutch systems 20 and 22, as well as the two brake systems 24, 26. Track control system 28 may also be operatively connected to drive system 18. Track control system 28 is capable of independently controlling the clutches 20, 22 and brakes 24, 26 thereby allowing the tracks 12, 14 to be independently operated.

For example, tracked vehicle 16 may be caused to move in the forward direction by engaging both clutches 20, 22 to connect the tracks 12, 14 to the drive system 18. A reversing system (not shown) operatively associated with drive system 18 allows the vehicle to be moved in the reverse direction by suitable engagement of the reversing system (not shown). The vehicle 16 may be steered by disengaging one of the clutches 20, 22, while allowing the other clutch 20, 22 to remain engaged, in the manner described herein below.

The track control system 28 is itself operated by control signals 32 that are generated or produced by control signal generator 30. More specifically, control signals 32 produced by control signal generator 30 cause the track control system 28 to operate the clutches 20, 22 and brakes 24, 26 in a manner consistent with the information contained in or encoded by the control signals 32. In the particular embodiment shown and described herein, the control signals 32 comprise pulse width modulated (PWM) signals in which the widths of the pulses are varied or modulated to encode the signals 32 with information sufficient to instruct the track control system 28 to control the various systems connected thereto, including the clutches 20, 22, and brakes 24, 26. Alternatively, other types of modulation or signal encoding techniques are possible. Consequently, the present invention should not be regarded as limited to use with systems having PWM control signals 32.

The control signal generator 30 may receive vehicle control commands (e.g., steering commands) from a vehicle control system (not shown) that controls the operation of the vehicle 16. The vehicle control system may comprise any of a wide variety of systems and devices suitable for controlling the vehicle. Examples of vehicle control systems include, but are not limited to, an autonomous vehicle control system, a semi-automatic control system (e.g., a remote-control system or an auto pilot), or even a human operator. Vehicle control commands from the vehicle control system are received by the control signal generator 30, which processes the vehicle control inputs to produce the vehicle control signals 32 in the manner described herein. However, because the present invention may be utilized with any of a wide range of vehicle control systems, and because a detailed description of such vehicle control systems is not required in order to understand and implement the present invention, the particular vehicle control system that may be utilized to provide vehicle control commands to the control signal generator 30 will not be described in further detail herein.

Referring now primarily to FIG. 2, with occasional reference to FIG. 1, the degree of modulation of the control signals 32 which, as mentioned, may comprise pulse width modulated (PWM) signals, will cause the track control system 28 to operate the clutch and brake systems in accordance with the particular control scheme illustrated in FIG. 2. While the control scheme illustrated in FIG. 2 is applicable to the operation of the clutch and brake systems 20 and 24 associated with the track 12, similar control signals may be used to operate the clutch and brake systems 22 and 26 associated with track 14. Consequently, the following description is limited to the operation of the clutch and brake systems 20 and 24 associated with track 12.

When the degree of modulation of the PWM control signals 32 is between 0% modulated and a modulation level $C_1$, the track control system 28 operates the clutch 20 so that it is in the fully engaged state. In this modulation range (i.e., between 0% and modulation level $C_1$), the track control system 28 operates the brake 24 so that it is in the fully released position. That is, the brake 24 will not apply any significant braking force to the track 12. In this regard it should be noted that the track control system 28 will not begin to apply the brake 24 until the modulation level of signals 32 reaches the level $C_3$. Stated another way, the control system 28 maintains the brake 24 in the fully released state or position so long as the modulation level of control signals 32 is lower than $C_3$.

If the level of modulation of the control signals 32 is between $C_1$ and $C_2$, then the track control system 28 operates the clutch 20 to transition it from the fully engaged state to the fully disengaged state. Stated another way, the clutch 20 is in a transition region when the modulation level of control signals 32 is between $C_1$ and $C_2$. Further, if the modulation level of the control signals 32 increases with time from $C_1$ to $C_2$, then the track control system 28 transitions the clutch 20 from the engaged state to the disengaged state. Conversely, the track control system 28 will transition the clutch 20 from the disengaged state to the engaged state when the modulation level of control signals 32 decreases with time from modulation level $C_2$ to modulation level $C_1$.

After the clutch 20 is disengaged and before the brake system 24 is applied, the track 12 operates in a freewheel state. That is, the track 12 is fully disconnected from the drive system 18 and is not slowed by braking forces applied by brake system 24. The track 12 remains in the freewheel state so long as the modulation level of control signals 32 remains between $C_2$ and $C_3$. However, when the modulation level of control signals 32 increases to $C_3$, the track control system 28 begins to activate the brake 24. That is, the track control system 28 places the brake 24 in an initial application state. When the brake 24 is in the initial application state, light braking forces are applied to track 12, thereby resisting its rotation. The track control system 28 continues to operate the brake system 24 to gradually increase the braking forces applied to the track 12 (with the increasing modulation of control signals 32) until the modulation level of control signals 32 reaches $C_4$, at which point maximum braking effort is applied to track 12. That is, brake 24 is in the full application state. Brake 24 will remain in the full application state so long as the modulation level of control signals 32 remains between $C_4$ and 100%.

Accordingly, tracked vehicle 16 may be made to move in any desired direction by providing the appropriately modulated control signals 32 to the track control system 28. By way of example, the tracked vehicle 16 may be moved in the forward direction by generating control signals 32 that cause the track control system 28 to engage both clutches 20, 22. Likewise, the tracked vehicle 16 may be stopped by disengaging the clutches 20, 22 and by applying the brakes 24, 26. The tracked vehicle 16 may be turned by stopping (i.e., braking) one track (e.g., track 12), while driving the other track (e.g., track 14) in the forward direction.

As briefly described above, the control signal generator 30 produces control signals 32 that vary in accordance with certain control profiles or schedules (some of which are described herein and others of which will become apparent to persons having ordinary skill in the art after becoming familiar with the teachings provided herein) to cause the track control system 28 to operate the clutches 20, 22 and brakes 24, 26 in a manner that will maximize vehicle control and responsiveness while at the same time reducing the stresses applied to the tracks and vehicle drive system components.

However, before considering particular exemplary control schedules that may be utilized to govern the variance (i.e., modulation levels) of the control signals 32, it is instructive to consider the response of the particular tracked vehicle to operation of the tracks. Once the response of the particular vehicle has been determined, a control schedule may be developed that may be used to modify the vehicle response characteristics to produce any of a wide range of desired results (i.e., vehicle response characteristics). For example, and as will be described in greater detail below, a non-linear vehicle response to the application of braking forces may be made linear, if desired, by developing the appropriate control schedule.

Figure 3:
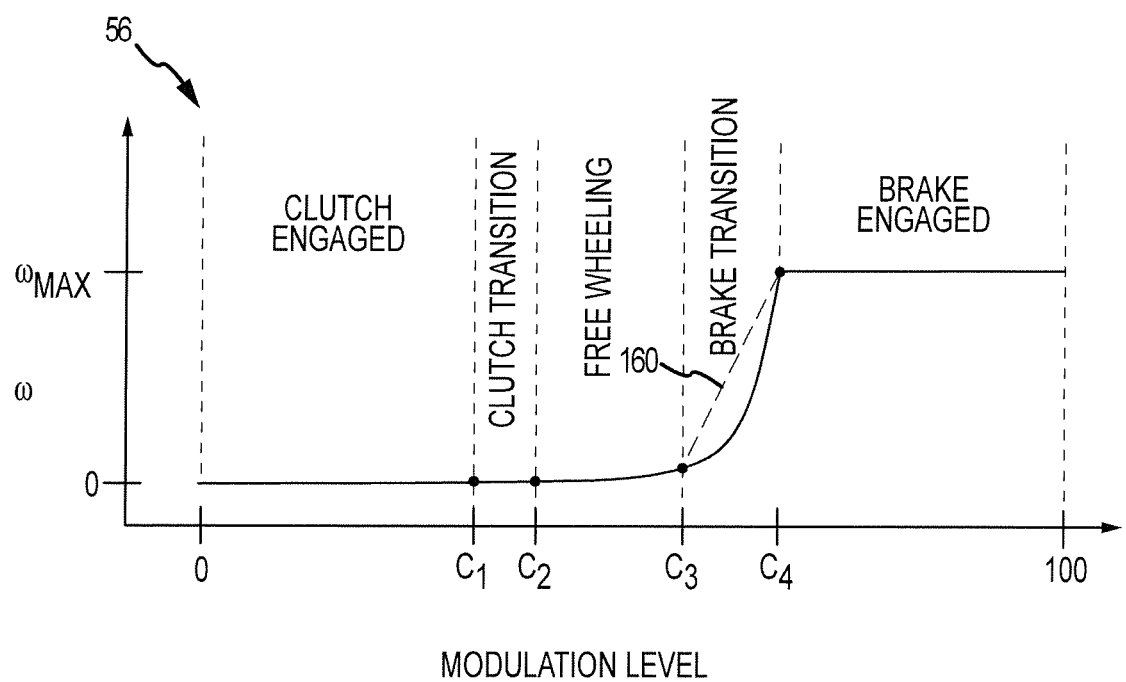
FIG. 3 is a graphical representation illustrating vehicle yaw rate in response to clutch and brake system operation.

Consider, for example, the vehicle response characteristic 56 illustrated in FIG. 3, which depicts the response of the example tracked vehicle 16 (e.g., a Caterpillar D-10 bulldozer) to a certain track control sequence. More specifically, FIG. 3 depicts the turning or yaw rate ω of the tracked vehicle 16 assuming that one track (e.g., track 14) is operating at full speed and the other track (e.g., track 12) is operating as a function of the modulation level of the control signals 32. The response characteristic 56 depicted in FIG. 3 also assumes that the modulation rate is changed in a constant and linear manner from 0% to 100 and also that the tracked vehicle 16 is operating on level ground.

As illustrated in FIG. 3, the vehicle yaw rate ω remains substantially zero while the clutch 20 (FIG. 1) is fully engaged and also during the time the clutch transitions from the engaged state to the disengaged state (i.e., up to a modulation level of about $C_2$). The yaw rate ω of the tracked vehicle 16 increases slightly during the freewheel period (i.e., when the modulation level of control signals 32 is between $C_2$ and $C_3$), but does not become significant until the brake 24 is initially applied (i.e., at a modulation level of C3), which begins to slow the freewheeling rotation of track 12.

As briefly described above, it should be noted that the yaw rate ω of vehicle 16 during the freewheel period may depart significantly from that depicted in FIG. 3 if the vehicle 16 is on an incline. For example, if the tracked vehicle 16 is ascending the incline, the freewheeling track 12 may stop or even reverse direction before the brake is applied, which would cause the vehicle 16 to turn sharper than expected. Conversely, if the vehicle 16 is descending the incline during the freewheel period, the freewheeling track may speed up, causing the vehicle 16 to turn in the opposite direction. Accordingly, the vehicle response during the freewheel period (i.e., when the modulation of control signals 32 is between $C_2$ and $C_3$) suggests the desirability of a rapid transition through the freewheel period so as to minimize as much as possible uncommanded or undesired vehicle movement.

When the modulation level of the control signals 32 reaches level $C_3$, the track control system 28 begins to apply the brake 24. That is, brake 24 is placed in the initial application state. At this point, the vehicle yaw rate ω begins to increase. However, the increase is not linear during the time the modulation state of control signals 32 is linearly increasing from $C_3$ to $C_4$. Instead, the vehicle response characteristic 56 (e.g., yaw rate ω) is exponential until the brake 24 is fully applied (which corresponds to a modulation level of $C_4$), at which point the vehicle yaw rate ω reaches its maximum ($ω_{max}$).

Referring now to FIG. 4, one embodiment of a control schedule 34 followed by the control signal generator 30 causes the control signal generator 30 to vary the modulation level of the control signals 32 at two different rates depending on the particular operational state of the track 12. For example, the control schedule 34 causes the control signal generator 30 to vary at a first rate 40 the modulation level of the control signals 32 between a modulation level of 0% and $C_3$. Moreover, this first rate 40 is linear, as indicated by the sloped, but straight line segment between 0% modulation and modulation level $C_3$. The rate of change of modulation level of the control signals 32 is then substantially reduced to a second rate 42 between modulation levels $C_3$ and $C_4$. The reduced rate of change of the modulation level of control signals 32 slows the application rate of the brake system 24, thereby reducing the stresses imposed on the track 12. This second rate 42 (i.e., the rate of change of the modulation level between $C_3$ and $C_4$) is less than the first rate 40, and is also linear, as indicated by the sloped, but straight line segment connecting levels $C_3$ and $C_4$. Once the maximum braking level has been reached at modulation level $C_4$, the control signal generator 30 may thereafter increase the modulation level of the control signals 32 to 100% substantially instantaneously, if desired, as illustrated by the vertical segment 44 between $C_4$ and 100% modulation.

The rates of change of the modulation level of signals 32, e.g., the first rate 40 and the second rate 42, may comprise any of a wide range of rates depending on the particular implementation, vehicle control system, vehicle response, and other factors, as would become apparent to persons having ordinary skill in the art after having become familiar with the teachings of the present invention. Consequently, the present invention should not be regarded as limited to any particular rates (e.g., first rate 40 and second rate 42). However, by way of example, in one embodiment, first rate 40 may be in a range of about 100% modulation per second (%/s) to as high as substantially instantaneous, although a transition rate 40 of about 300%/s is preferred. Accordingly, the time within which the control signals 32 are varied from 0% modulation to modulation level $C_3$ may be in a range of about 0.025 seconds (s) to about 0.25 s (about 0.083 s preferred). The second rate 42 may be selected to be in a range of about 10% modulation per second (%/s) to about 100%/s (about 20%/s preferred). Accordingly, the time within which the control signals 32 are varied from modulation level $C_3$ to modulation level $C_4$ may be in a range of about 0.25 seconds (s) to about 1.3 s (about 0.65 s preferred).

As already briefly described, the dual rate transition of the present invention may be used to advantage wherein it is desired to cycle the stopped track between the fully braked state and the driven state some number of times during a commanded turn. In such a scenario, the control schedule 34 may comprise an alternating schedule wherein after some period of braking, i.e., where the track is stopped for a certain period of time, the track will be re-connected to the drive system 18, before again being disconnected from the drive system.

More specifically, and still referring to FIG. 4, a given track cycle time 38 will comprise a track "off" period 46 and a track "on" period 48. The track "off" period 46 corresponds to that period of time during the cycle 38 where the track 12 is disengaged (or is being disengaged) from the drive system 18 (FIG. 1), and the brake 24 is being applied to slow and perhaps eventually stop the motion of the track 12. The track "on" period 48 corresponds to that period of time during the cycle 28 where the track 12 is being driven, i.e., wherein track 12 is re-engaged (or is being re-engaged) with the track drive system 18.

As mentioned above, it is generally not desired to allow the track 12 to remain stopped for the duration of large turns (e.g., turns involving a substantial heading change), lest the stopped track become dug-in or bogged down in the material being traversed. Thus, a given turn may comprise a number of cycles 38, 38' during which the track is alternately stopped (i.e., during the "off" period 46, 46') and driven (i.e., during the "on" period 48, 48').

In addition, and in the embodiments shown and described herein, the control schedule 34 may be provided with a minimum track "on" period 54 of some selected minimum time duration to ensure that the track 12 remains in the "on" period for at least some portion of the cycle time 38. That is, control schedule 34 may be configured to require the track 12 be in the on or driven state for at least the minimum track "on" period 54 in order to minimize the likelihood of track dig-in. Stated another way, while the track "off" period 46 and the track "on" period 48 each may be varied during the cycle time 38 to achieve the desired rate of turn, the control signal generator 30 will ensure that the track "on" period 48 does not fall below the minimum track "on" period 54. Subsequent cycles (e.g., 38') may also be provided with such a minimum track "on" period (e.g., 54').

As mentioned, the control signal generator 30 may be configured to vary the lengths or durations of the track "off" period 46 and the track "on" period 48 during the cycle time 38 in order to achieve a desired rate of turn or other desired vehicle response. For example, higher turn rates may result from shorter track "off" periods 46, whereas longer track "off" periods 46 may result in lower turn rates. However, other factors may also be considered and result in a change of the relative durations of the track "off" and "on" periods 46 and 48. Such other factors may include, but are not limited to, whether the vehicle 16 is traversing a slope or incline, the nature of the material being traversed, and the area available for maneuvering. Consequently, the present invention should not be regarded as limited to any particular cycle time 38 or relative durations of the track "off" period 46 and the track "on" period 48. However, by way of example, in one embodiment, the track cycle time 38 may be in a range of about 0.5 seconds to about 2.5 seconds. The track "off" period 46 may be varied between about 0.4 seconds and about 2 seconds, whereas the track "on" period 48 may be varied between about 0.1 seconds and about 2.5 seconds. The minimum track "on" period 54 may be in a range of about 0.1 seconds to about 0.5 seconds.

The transition from the track "off" period 46 to the track "on" period 48 may also be accomplished at two different transition rates 50, 52, as also illustrated in FIG. 4. For example, at the end of the track "off" period 46, the control signal generator 30 (FIG. 1) may substantially instantaneously vary the level of modulation of the control signals 32 from 100% to the level $C_3$, which corresponds to the initial brake state. That is, the control signals 32 may be varied so as to result in the substantially instantaneous release of the brake 24. This substantially instantaneous rate 50 corresponds to the vertical line segment between 100% modulation and the modulation level $C_3$. Thereafter, the control signal generator 30 may vary the modulation of the control signals 32 from the level $C_3$ to 0% modulation at a rate 52 that is less than the rate 50 of variation from 100% modulation to the modulation level $C_3$. This corresponds to the sloped line segment between modulation level $C_3$ and 0% modulation. Thereafter, another cycle 38' may be initiated in the manner depicted in FIG. 4. Subsequent cycles may be initiated until the vehicle 16 has turned by the desired amount.

The rates of change of the modulation level of signals 32, e.g., the first rate 50 and the second rate 52, may comprise any of a wide range of rates depending on the particular implementation, vehicle control system, vehicle response, and other factors, as would become apparent to persons having ordinary skill in the art after having become familiar with the teachings of the present invention. Consequently, the present invention should not be regarded as limited to any particular rates (e.g., first rate 40 and second rate 42). However, by way of example, in one embodiment, first rate 50 may be high (e.g., substantially instantaneous), causing the modulation level of signals 32 to change substantially instantaneously from 100% modulation to modulation level $C_3$. The second rate 52 may be selected to be in a range of about 300% modulation per second (%/s) to nearly instantaneously (about 300%/s preferred). Accordingly, the time within which the control signals 32 are varied from modulation level $C_3$ to 0% modulation may be in a range of about 0.2 seconds (s) to nearly instantaneously (about 0.2 s preferred).

Figure 5:
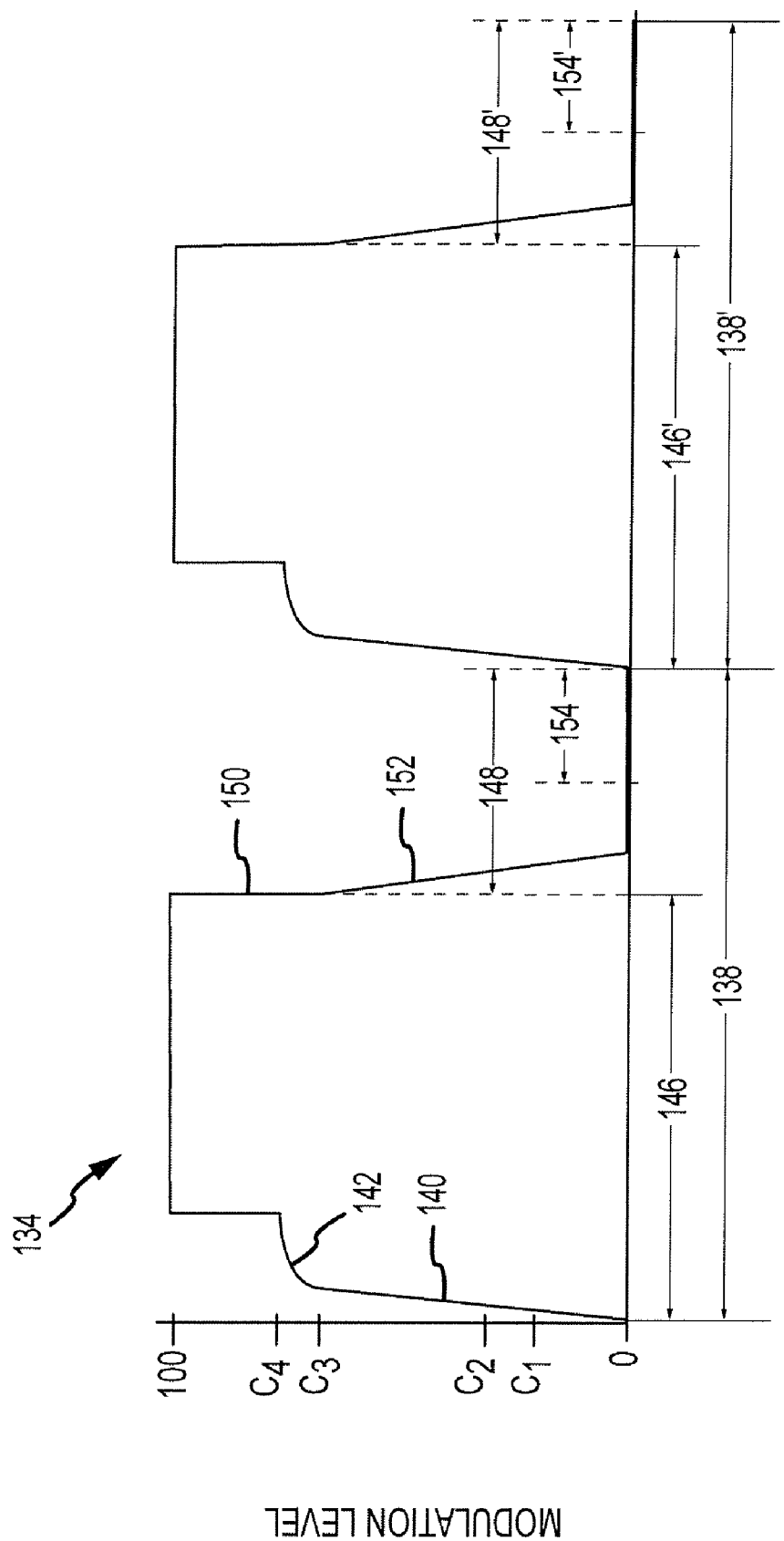
FIG. 5 is a graphical representation of an alternate embodiment of a clutch/brake time cycle control schedule.

As mentioned above, it is possible to develop control schedules that will result in a change in the vehicle response dynamics over what could be achieved with control schedules having purely linear transitions, such as those illustrated in FIG. 4. For example, a second embodiment of a control schedule 134 is illustrated in FIG. 5 still comprises a dual transition control schedule having a first transition period having a first rate 140 and a second transition period having a second rate 142. As was the case for the first embodiment, the second transition rate 142 is less than the first transition rate 140. However, while the first transition rate 140 is linear (as indicated by the straight line segment between a modulation level of about 0% and modulation level $C_3$), the second transition rate 142 is non-linear linear (as indicated by the curved line segment between modulation level $C_3$ and modulation level $C_4$).

More specifically, in the embodiment illustrated in FIG. 5, the second, non-linear transition rate 142 is exponential and is selected to be the multiplicative inverse of the exponential vehicle response characteristic 56 exhibited during the braking transition region between modulation levels $C_3$ and $C_4$, illustrated in FIG. 3. So configuring the second transition rate 142 to be the multiplicative inverse of the vehicle response characteristic 56 in this region (i.e., between $C_3$ and $C_4$) will alter the vehicle response characteristic 56 in this region so that it changes from a non-linear (e.g., exponential) response to a substantially linear response during the brake transition region between modulation levels $C_3$ and $C_4$. In effect, the second transition rate 142 will cause the vehicle response characteristic 56 to change during the braking period to substantially follow the broken line 160 indicated in FIG. 3.

Referring back now primarily to FIG. 5, the non-linear transition rate 142 may be determined by any of a wide range of methods and in accordance with any of a wide range of mathematical relationships in order to produce the desired vehicle response (e.g., broken line 160 in FIG. 3). Consequently, the present invention should not be regarded as limited to any particular non-linear transition rate 142. However, by way of example, in one embodiment, the incremental change Δp of the modulation level during the brake transition region (i.e., between modulation levels $C_3$ and $C_4$) may be determined as follows:

$$\Delta p = k_1 \exp\left[-k_2 \frac{p_{n-1} - C_3}{C_4 - C_3}\right]$$

and $Pn = p_{n-1} + \Delta p$ where:
p is the modulation level (e.g., the PWM modulation percentage);
$C_3$ is the modulation level corresponding to the initial brake application state;
$C_4$ is the modulation level corresponding to the full brake application state;
$k_1$ is the modulation level scale factor;
$k_2$ is the exponent scale factor;
n denotes the current discrete time instance; and
n−1 denotes the previous discrete time instance.

As was the case for the first control schedule 34, the transition from the track "off" period 146 and the track "on" period 148 in the second control schedule 134 may be accomplished at rates 150, 152 that are also different from one another. More specifically, in the second control schedule 134, the control signals 32 (which are varied or modulated in accordance with the various control schedules 34, 134) may be varied at rate 150 so as to result in the substantially instantaneous release of the brake 24. This substantially instantaneous rate 150 corresponds to the vertical line segment between 100% modulation and the modulation level $C_3$. Thereafter, the control signal generator 30 may be operated to vary the modulation of the control signals 32 from the level $C_3$ to 0% modulation at a rate 152 that is less than the rate 150 of variation from 100% modulation to the modulation level $C_3$. This rate 152 corresponds to the sloped line segment between modulation level $C_3$ and 0% modulation.

The second control schedule 134 may also comprise a track "off" period 146 and a track "on" period 148 in order to reduce the likelihood of track dig-in during a commanded turn. Control schedule 134 may also be provided with a minimum "off" period 154 to ensure that the track 12 remains in the "off" period for at least some portion of the cycle time 138. Put another way, control schedule 134 will require that the track be in the on or driven state for at least the minimum track "on" period 154 in order to minimize the likelihood of track dig-in.

As was the case for the first control schedule 34, vehicle turns involving the second control schedule 134 may comprise a plurality of cycles 138, 138' during which the track is alternately stopped (i.e., during the "off" periods 146, 146') and driven (i.e., during the "on" periods 148, 148'). Each such cycle 138, 138' may also comprise a minimum "on" period 154, 154'. Subsequent cycles may be initiated until the vehicle has turned by the desired amount.

Having herein set forth preferred embodiments of the present invention, it is anticipated that suitable modifications can be made thereto which will nonetheless remain within the scope of the invention. The invention shall therefore only be construed in accordance with the following claims.

The invention claimed is:

1. A method for controlling a track on a tracked vehicle, comprising:
   receiving a vehicle control command from a vehicle control system;
   processing the vehicle control command in accordance with a control schedule to produce control signals; and
   applying the control signals to a track control system, the control signals causing the track control system to at least:
      operate the track in a driven state;
      transition the track from the driven state to an initial brake application state at a first rate; and
      transition the track from the initial brake application state to a full brake application state at a second rate, the second rate being less than the first rate.

2. The method of claim 1, wherein said processing further comprises producing control signals that vary in a linear manner to cause the track control system to transition the track from the driven state to the initial brake application state at the first rate.

3. The method of claim 1, wherein said processing further comprises producing control signals that vary in a linear manner to cause the track control system to transition the track from the initial brake application state to the full brake application state at the second rate.

4. The method of claim 1, wherein said processing further comprises producing control signals that vary in a non-linear manner to cause the track control system to transition the track from the initial brake application state to the full brake application state at the second rate.

5. The method of claim 1, wherein said processing further comprises producing control signals that vary in an exponential manner to cause the track control system to transition the track from the initial brake application state to the full brake application state.

6. The method of claim 1, wherein said processing further comprises producing control signals that cause the track control system to transition the track through a freewheeling state between the driven state and the initial brake application state.

7. The method of claim 1, wherein said processing further comprises producing control signals that cause the track control system to transition the track from the full brake application state to the initial brake application state at a third rate.

8. The method of claim 7, wherein said processing further comprises producing control signals that cause the track control system to transition the track from the initial brake application state to the driven state at a fourth rate, the fourth rate being less than the third rate.

9. The method of claim 1, wherein said processing further comprises producing control signals that define a track cycle time, the track cycle time comprising a track "off" period and a track "on" period.

10. The method of claim 9, wherein said processing further comprises producing control signals that define a plurality of track cycle times.

11. The method of claim 9, wherein the cycle time comprises a minimum track "on" period.

12. A method for controlling a track on a tracked vehicle, comprising:
   receiving a vehicle control command from a vehicle control system;
   processing the vehicle control command in accordance with a control schedule to produce control signals;
   applying to a track control system a first control signal that varies at a first rate to cause the track control system to transition the track from a driven state to an initial brake application state; and
   applying to the track control system a second control signal that varies at a second rate to cause the track control system to transition the track from the initial brake application state to a full brake application state, the second rate of said second control signal being less than the first rate of the first control signal.

13. The method of claim 12, further comprising varying the first control signal in a linear manner to cause the track control system to transition the track from the driven state to the initial brake application state.

14. The method of claim 12, further comprising varying the second control signal in a linear manner to cause the track control system to transition the track from the initial brake application state to the full brake application state.

15. The method of claim 14, wherein varying the second control signal in a linear manner to cause the track control system to transition the track from the initial brake application state to the full brake application state would result in an exponential vehicle response, said method further comprising varying the second control signal so that said second control signal is a multiplicative inverse of the exponential vehicle response, so that said applying the second control signal to transition the track from the initial brake application state to the full brake application state results in a linear vehicle response.

16. The method of claim 12, further comprising varying the second control signal in a non-linear manner to cause the track control system to transition the track from the initial brake application state to the full brake application state.

17. Apparatus for controlling a track on a tracked vehicle, comprising:
   a drive system;
   a clutch operatively associated with said drive system and the track, said clutch being transitionable between an engaged state and a disengaged state to connect and disconnect the track from said drive system;
   a brake operatively associated with the track, said brake being transitionable between an initial application state and a full application state;
   a track control system operatively associated with said clutch and said brake; and
   a control signal generator operatively associated with said track control system, said control signal generator producing control signals that vary at a first rate to cause said track control system to transition said clutch from the engaged state to the disengaged state and that vary at a second rate to cause said track control system to transition said brake from the initial application state to the full application state, the second rate being less than the first rate.

18. The apparatus of claim 17, wherein said control signal generator produces signals to cause said track control system to maintain said clutch in the disengaged state while not operating said brake to allow said track to freewheel.

19. The apparatus of claim 17, wherein said first rate comprises a linear rate and wherein said second rate comprises a linear rate.

20. The apparatus of claim 17, wherein said first rate comprises a linear rate and wherein said second rate comprises a non-linear rate.

21. The apparatus of claim 20, wherein the non-linear second rate is selected to result in a linear vehicle response to the transition of said brake from the initial application state to the full application state.

22. The apparatus of claim 21, wherein the linear vehicle response is a brake application rate.

23. The apparatus of claim 21, wherein the linear vehicle response is a vehicle yaw rate.

24. The apparatus of claim 17, wherein said track control system is responsive to a pulse-width modulated signal and wherein said control signal generator produces a pulse-width modulated signal.

25. The apparatus of claim 24, wherein said control signal generator varies a pulse width of the pulse-width modulated signal in a linear manner at the first rate, and wherein said control signal generator varies the pulse width of the pulse-width modulated signal in a linear manner at the second rate.

26. The apparatus of claim 24, wherein said control signal generator varies a pulse width of the pulse-width modulated signal in a linear manner at the first rate, and wherein said control signal generator varies the pulse width of the pulse-width modulated signal in a non-linear manner to achieve the second rate.

* * * * *

UNITED STATES PATENT AND TRADEMARK OFFICE
CERTIFICATE OF CORRECTION

PATENT NO. : 7,784,568 B2  
APPLICATION NO. : 12/233284  
DATED : August 31, 2010  
INVENTOR(S) : John Petersen and Eric Poulson It is certified that error appears in the above-identified patent and that said Letters Patent is hereby corrected as shown below:

Column 11, Line 48: Delete "linear" after "non-linear"

Signed and Sealed this
Fourth Day of January, 2011

David J. Kappos
*Director of the United States Patent and Trademark Office*